United States Patent
Huguet et al.

(10) Patent No.: US 9,458,064 B2
(45) Date of Patent: Oct. 4, 2016

(54) COLOURED TECHNICAL CERAMIC BODIES AND METHOD FOR OBTAINING THE SAME

(71) Applicant: ROLEX S.A., Genève (CH)

(72) Inventors: Pierre Huguet, Allinges (FR); Carine Bienvenu, Pringy (FR)

(73) Assignee: Rolex S.A., Geneva (CH)

(*) Notice: Subject to any disclaimer, the term of this patent is extended or adjusted under 35 U.S.C. 154(b) by 0 days.

(21) Appl. No.: 14/647,641

(22) PCT Filed: Dec. 20, 2013

(86) PCT No.: PCT/EP2013/077605
§ 371 (c)(1),
(2) Date: May 27, 2015

(87) PCT Pub. No.: WO2014/096318
PCT Pub. Date: Jun. 26, 2014

(65) Prior Publication Data
US 2015/0307405 A1    Oct. 29, 2015

(30) Foreign Application Priority Data
Dec. 21, 2012 (EP) ................................. 12198972

(51) Int. Cl.
*C04B 35/48* (2006.01)
*C04B 35/49* (2006.01)
(Continued)

(52) U.S. Cl.
CPC ............ *C04B 35/64* (2013.01); *C04B 35/48* (2013.01); *C04B 41/009* (2013.01);
(Continued)

(58) Field of Classification Search
CPC ... C04B 35/48; C04B 35/486; C04B 35/488; C04B 35/4885; C04B 20/10; C04B 20/1059; C04B 20/1092
USPC ........................................ 501/103, 104, 105
See application file for complete search history.

(56) References Cited

U.S. PATENT DOCUMENTS

| 5,326,518 A * | 7/1994 | Kimura ............... B28B 1/24 264/328.2 |
| 6,517,623 B1 * | 2/2003 | Brodkin ............... C03B 19/06 106/35 |

(Continued)

FOREIGN PATENT DOCUMENTS

| DE | 2012304 A1 | 9/1971 |
| DE | 19701080 C1 | 7/1998 |

(Continued)

OTHER PUBLICATIONS

Liu et al. Fabrication of coloured zirconia ceramics by infiltrating water debound injection moulded green body. Advances in Applied Ceramics. Dec. 2010. p. 1-5.*

(Continued)

*Primary Examiner* — Noah Wiese
(74) *Attorney, Agent, or Firm* — Barnes and Thornburg LLP (57) ABSTRACT

The invention relates to coloured ceramic bodies and a method for obtaining these coloured ceramic bodies. The method of the invention comprising the following steps: providing a composition comprising a technical ceramic material, a first pigment component and optionally binder materials, preparing a green body from this composition, optionally debinding the green body, thereafter subjecting the green body to a treatment with a metal-containing preparation as a further pigment component, and sintering the treated green body. The coloured technical ceramic body of the present invention consists of a technical ceramic material, the technical ceramic body comprising a first coloured area and a second coloured area of a different colour, whereby the first coloured area contains a first pigment component, and the second coloured area contains a second pigment component which is formed from the first pigment component and the further pigment component.

18 Claims, 1 Drawing Sheet

(51) Int. Cl.
    *C04B 35/64*     (2006.01)
    *C04B 41/85*     (2006.01)
    *C04B 41/00*     (2006.01)
    *C04B 41/50*     (2006.01)
    *G04B 37/22*     (2006.01)
    *C04B 111/82*     (2006.01)

(52) U.S. Cl.
    CPC .......... *C04B 41/5007* (2013.01); *C04B 41/85* (2013.01); *G04B 37/226* (2013.01); *C04B 2111/82* (2013.01); *C04B 2235/9661* (2013.01)

(56) References Cited

U.S. PATENT DOCUMENTS 7,897,253 B2 * 3/2011 Fink-Petri .............. B82Y 30/00
    428/325

2008/0026207 A1 * 1/2008 Fink-Petri .............. B82Y 30/00
    428/328
2013/0341812 A1 * 12/2013 Schechner ........... A61K 6/0094
    264/17

FOREIGN PATENT DOCUMENTS

| | | |
|---|---|---|
| EP | 0927710 A1 | 7/1999 |
| EP | 2500009 A1 | 9/2012 |
| WO | 0210092 A1 | 2/2002 |
| WO | 2008000716 A1 | 1/2008 |
| WO | 2011120181 A1 | 10/2011 |

OTHER PUBLICATIONS

Written Opinion of the ISA/EP completed on Apr. 3, 2014 and issued in connection with PCT/EP2013/077605.
PCT International Search Report completed by the ISA/EP on Apr. 3, 2014 and issued in connection with PCT/EP2013/077605.

* cited by examiner

COLOURED TECHNICAL CERAMIC BODIES AND METHOD FOR OBTAINING THE SAME

This application is a U.S. national counterpart application of international application serial No. PCT/EP2013/077605 filed Dec. 20, 2013, which claims the benefit of European Patent Application No. 12198972.7 filed Dec. 21, 2012.

TECHNICAL FIELD

The present invention relates to novel coloured technical ceramic bodies. The present invention furthermore relates to a method for the formation of such coloured technical ceramic bodies.

BACKGROUND ART

The impregnation of technical ceramic products in order to achieve a colouring of the product is described in DE 2012304. Coloured ceramic products are achieved according to the teaching of the document by impregnating molded parts with aqueous solutions of colourant heavy metal compounds. The molded parts are prepared from suitable ceramic materials such as clay and kaolin which are formed into the wanted shape and treated with heat in the range of 800 to 1400° C. No pigment is present in the molded parts and the colouring is achieved through impregnation with the aqueous solution and subsequent heat treatment.

In WO 00/15580 the impregnation of ceramics is described which comprises a non-coloured metallic oxide of spinel- or rutile-structure ($TiO_2$, $SnO_2$, $ZrO_2$, or $ZrSiO_4$) that serves as a host lattice to fix bivalent or trivalent metallic ions. The ions are introduced through impregnation of an aqueous solution and allow to colour the ceramic. No indication of conditions used for pre-sintering, impregnation and drying are given. All examples concern the impregnation of clay by Ti/Sb/Cr solutions and yield yellow-ocre colours.

DISCLOSURE OF THE INVENTION

Problems to be Solved by the Invention

It is the object of the present invention to provide a method for the preparation of bi-coloured technical ceramic bodies which display favourable properties. Such favourable properties are for instance advantageous mechanical properties and a sharp demarcation of the different coloured areas of the bicoloured technical ceramic bodies.

Bi-coloured watch components, in particular components for the watch case such as blue-black or brown-black bezels, shall be obtained with mechanical properties and aesthetics comparable to those of mono-coloured bezels.

The main challenges in the realization of such components are to obtain a suitable second colour from a previously coloured ceramic and/or existing pigment in the ceramic, and to ensure that the demarcation between the different coloured zones is clean and sharp, while retaining highly favourable mechanical properties.

Means for Solving the Problems

1. Method for the production of a coloured technical ceramic body, comprising the following steps:
providing a composition comprising a technical ceramic material, a first pigment component and optionally binder materials,
preparing a green body from this composition,
optionally debinding the green body,
thereafter subjecting the green body to a treatment with a metal-containing preparation as a further pigment component, and
sintering the treated green body.
2. The method of aspect 1, wherein the composition comprises binder materials and the step of debinding the green body is included, wherein the debinding step consists in treating the green body with heat, or in treating the green body with an aqueous solution and subsequently drying the treated green body.
3. The method of aspect 1 or 2, wherein the technical ceramic material is zirconia, which is stabilized with yttria, calcia, ceria, or magnesia.
4. The method of any of aspects 1 to 3, wherein the first pigment component is selected from the group consisting of the compounds $Al_2O_3$, CoO, $Co_2O_3$, $Co_3O_4$, $Cr_2O_3$, $Cu_2O$, CuO, $Fe_2O_3$, $Fe_3O_4$, MnO, $Mn_2O_3$, $MnO_2$, $MoO_2$, $MoO_3$, NbO, $NbO_2$, $Nb_2O_5$, NiO, PbO, $PbO_2$, SnO, $SnO_2$, TiO, $Ti_2O_3$, $TiO_2$, $VO_2$, $V_2O_5$, $WO_2$, $W_2O_5$ and $WO_3$.
5. The method of aspect 4, wherein the first pigment component is selected from $Al_2O_3$ and $Fe_2O_3$.
6. The method of any of aspects 1 to 3, wherein the first pigment component is a complex inorganic pigment compound showing a spinel crystal structure of space group Fd-3m.
7. The method of aspect 6, wherein the first pigment component has the formula (Fe,Co,Ni,Zn,Mn)(Al,Cr,Fe)$_2O_4$.
8. The method of any of the previous aspects, wherein the treatment with heat for debinding the green body is conducted at a temperature in the range of 700 to 1200° C.
9. The method of any of the previous aspects, whereby the green body is subjected partly to a treatment with the metal-containing preparation.
10. The method of any of the previous aspects, wherein the treatment with the metal-containing preparation is an impregnation with a solution of a metal-containing further pigment component which is followed by drying of the impregnated body.
11. The method of aspect 10, wherein the impregnating solution is a solution of at least one salt of Co, Cu, Cr, Fe, Mg, Mn, Mo, Ni, Ti and Zn in water and/or if appropriate at least one organic solvent.
12. The method of aspect 10 or 11, wherein the drying step after the impregnation is conducted at ambient temperature during 12 to 24 hours, or at 60-100° C. during 1 to 60 minutes.
13. The method of any of the previous aspects, wherein the body which has been treated with a metal-containing preparation as a further pigment component and has been optionally dried is sintered at a temperature of between 1300 and 1550° C.

14. The method of any of the previous aspects, wherein the coloured technical ceramic body of any of the aspects 14 to 16 which is a watch case bezel.
15. A coloured technical ceramic body, consisting of a technical ceramic material, the technical ceramic body comprising a first coloured area and a second coloured area of a different colour, whereby the first coloured area contains a first pigment component, and the second coloured area contains a second pigment component which is formed from the first pigment component and the further pigment component.
16. The coloured technical ceramic body according to aspect 15, in which the first coloured area contains a pigment component corresponding to a cubic phase of space group Fd-3m, such as a $CoAl_2O_4$ pigment and the second coloured area comprises the pigment component in combination with at least one of Co, Cu, Cr, Fe, Mg, Mn, Mo, Ni, Ti and Zn.
17. The coloured technical ceramic body according to aspect 15 or 16, wherein the first coloured area has a blue, brown or white colour and the second coloured area has a blue or black colour.
18. The coloured technical ceramic body of any of the aspects 15 to 17 which is a watch case bezel.

DETAILED DESCRIPTION OF THE INVENTION

The inventors discovered that the colour of a technical zirconia ceramic component can be modified by impregnation of the green body with a metallic salt solution. For example, impregnating a zirconia green body that comprises a blue or a brown pigment with an aqueous solution of $FeCl_3$, $NiCl_2$ and $CrCl_3$ yields a black colour that is equivalent to the one of a commercially available black ceramic. Bi-coloured watch components, in particular components for the watch case such as blue-black or brown-black bezels, have been obtained with mechanical properties and aesthetics comparable to those of mono-coloured bezels.

First, the method of the present invention is described.

In a first step of the method of the present invention, a green body is prepared from a composition comprising a technical ceramic material and a pigment component.

Generally speaking, technical ceramic materials display a number of properties which make them suitable for a range of different applications. More in particular, such properties are hardness, physical stability, extreme heat resistance, and chemical inertness, among others.

The technical ceramic bodies produced in the method according to the present invention consist of a technical ceramic material. Suitable technical ceramic materials are materials such as alumina, aluminium nitride, aluminium silicate; zirconium silicate, boron carbide, boron nitride; nitrides, carbides and carbonitrides of zirconium, titanium, hafnium, niobium and/or silicon; barium titanate, magnesium oxide, titania and zirconia. In the context of the present invention alumina and zirconia are preferred and zirconia is particularly preferred.

Doping of the ceramic materials in order to stabilize them is possible, as is well known in the technical field of the preparation of technical ceramic bodies. Additives such as magnesia, ceria, calcia and yttria can stabilize zirconia to minimize volume changes during heat treatment and subsequent cooling. Yttria-stabilized zirconia (YSZ) is a zirconium-oxide based ceramic in which the particular crystal structure of zirconium oxide is made stable at room temperature by an addition of yttrium oxide, and which displays properties which are particularly suitable.

The composition for preparing the green body furthermore contains a pigment component. Since the method of the present invention provides for a subsequent treatment with a metal-containing preparation as a further pigment component, the pigment component which is present in the composition for preparing the green body may be referred to as "the first pigment component".

A "pigment component" in the sense of the present invention means generally a component which after treatment by heat, such as typically a sintering treatment, provides a colour to the sintered product. This colour after sintering can be displayed before the sintering takes place. In that manner, a reference to a "blue ceramic" means a material which comprises a blue pigment before sintering, or which forms a blue pigment after the sintering heat treatment. It is also possible that the colour provided by the pigment component is a white colour, which may for instance be observed as the colour of the first area.

As will be described hereafter, it is an embodiment of the method of the present invention that the green body which is prepared from the composition will be subjected in a next step only partly to a treatment with a metal-containing preparation so that a part of the surface of the green body remains untreated, in the sense that it is brought into contact with the metal-containing preparation. The colour which is formed in this untreated part of the finally obtained sintered product depends on the first pigment component which is present in the initially provided composition containing the technical ceramic material.

Among pigment components that can be used as the first pigment component are oxides or nanoparticles of polyvalent metals, which will provide the colour in the sintered product. Preferred metal elements include transition metal and metal elements from the lanthanide and actinide series.

Preferred pigment components are metal powders, metal oxide powders, their precursor compounds which form metal oxides under heat, colouring pigments or mixtures from these materials. Particularly preferred are lanthanides or their oxides and metals of the groups 4 to 12 of the periodic system or their oxides. The metals Al, Co, Cr, Cu, Fe, Mn, Mo, Nb, Ni, Pb, Sn, Ti, V and W are preferred, and as their oxides the compounds $Al_2O_3$, CoO, $Co_2O_3$, $Co_3O_4$, $Cr_2O_3$, $Cu_2O$, CuO, $Fe_2O_3$, $Fe_3O_4$, MnO, $Mn_2O_3$, $MnO_2$, $MoO_2$, $MoO_3$, NbO, $NbO_2$, $Nb_2O_5$, NiO, PbO, $PbO_2$, SnO, $SnO_2$, TiO, $Ti_2O_3$, $TiO_2$, $VO_2$, $V_2O_5$, $WO_2$, $W_2O_5$ and $WO_3$. The preferred embodiments in this group of metal oxides are $Al_2O_3$ and $Fe_2O_3$. It is also preferred to use the metals in the form of metal salts or metal complexes, such as salts of carboxylates, carbonates, nitrates or acetylacetonates which under sintering are converted into the corresponding oxides. Combinations of the pigment components is possible.

Further preferred pigment components are so-called complex inorganic colour pigments of the spinel type of the general formula $AB_2O_4$, with A being a divalent metal cation and B a trivalent metal cation. Typical examples of the spinels are $CoAl_2O_4$ (cobalt aluminate), $MgAl_2O_4$ and $ZnAl_2O_4$. A variety of metallic elements can be incorporated in spinel structures, provided that the oxidation states are compatible. For instance, the $Co^{2+}$ can be substituted with $Zn^{2+}$, $Mn^{2+}$, $Ni^{2+}$ or $Fe^{2+}$, the $Al^{3+}$ can be substituted with $Cr^{3+}$ or $Fe^{3+}$, yielding compounds such as the particularly preferred $(Fe,Co,Ni,Zn,Mn)(Cr,Al,Fe)_2O_4$. The crystal structure is always the same and corresponds to space group Fd-3m.

Other complex inorganic colour pigments could be chosen among compounds showing inverse spinel structures, tetragonal spinel structures, rutile structures, or hematite or corundum structures.

A blue pigment is for instance a compound of the formula $(Co_{1-x}Zn_x)(Al_{1-y}Cr_y)_2O_4$ with $x,y \geq 0$ and spinel crystal structure, corresponding to space group Fd-3m.

A brown pigment is for instance $Fe_2O_3$ in yttriated zirconia (zirconia stabilized with yttria).

A white pigment is for instance $Al_2O_3$ in yttriated zirconia (zirconia stabilized with yttria).

The first pigment component which is present in the technical ceramic material may be any of a blue, brown, white or green pigment. Since pigments sometimes have no colour before firing, the "green, blue or brown pigment" in connection with the method of the present invention means a pigment which leads to a green, blue or brown colour after the final sintering step. Of course, other pigments may be present, either alone and/or in combination with the aforementioned pigments and/or in combination with each other, such as red, yellow or orange pigments for example.

Usually one pigment shall be present in the composition for preparing the green body, but more than one pigment component may be present as well, depending on the intended effect in the final sintered product which is obtained in the method of the present invention.

The amount of the pigment component in the technical ceramic material shall be such that the wanted intensity of the colour is achieved. A usual amount is between 1 and 10% by weight related to the total weight of the composition comprising the technical ceramic material and the first pigment component.

The composition for preparing the green body may contain further components besides the technical ceramic material and the first pigment component. For instance the presence of a binder component may be an advantage in the preparation of the green body.

The binders which are optionally used in the preparation of the green body are not particularly limited and any material which is suitable in aiding the formation of the green body may be used. Regularly the binder material is an organic material and for this organic material a polymer material such as polyethylene, polyethylene glycol (PEG), polyvinyl acetate, polyoxymethylene (POM), polyvinyl butyral (PVB), polytetrafluoroethylene or poly(methacrylate)-co-ethylene glycol dimethacrylate (PMMA) may be chosen.

The presence of such an organic binder makes the formation of the green body easier, in the sense that it can be more easily shaped in a particular form. For the formation of the green body any conventional method described in the state of the art may be chosen. Such conventional methods for preparing the green body include injection molding, tape casting, dry pressing, slip casting and extrusion. In any of these methods a product of a particular shape is obtained which may be subjected to the further treatments.

For an injection feedstock, the amount of the binder material in the green body is preferably chosen in the range of 15 to 25 parts by weight, relative to 100 parts by weight of the composition comprising the technical ceramic material and the pigment components. The amount of binder material can be different for materials used with processes other than injection, such as in a pressing powder for pressing.

For an injection feedstock, the amount of the binder material in the green body is preferably chosen in the range of 15 to 25 parts by weight, relative to 100 parts by weight of the composition comprising the technical ceramic material and the pigment components. The amount of binder material can be different for materials used with processes other than injection, such as in a pressing powder for pressing.

After the formation and shaping of the green body, it is treated with heat in a first heat-treatment step. In this first heat-treatment step the green body is treated with heat in order to remove the binders, insofar as these have been present during the preparation of the green body. This first heat-treatment step is therefore regularly called the debinding step. It is the further intention of this first heat-treatment step that the porous volume in the green body is optimized and the material of the green body is solidified in a manner which allows subsequent handling.

The first heat-treatment step is conducted at a temperature in the range of 700 to 1200° C. It is the intention of this first heat-treatment step to generate the appropriate level of porosity in the green body. What shall not be achieved is the disappearance of the pores. A preferred range for the temperature in the first sintering step may be the range between 750 and 1150°, and a typical temperature chosen for the first sintering step is 900° C.

The debinding or first heat-treatment leads to the generation of open pores in the green body which makes the subsequent treatment with a metal-containing preparation easier and leads to a better final result. It has been observed that the treatment at the temperatures 750, 900, 950 and 1100° C. leads to comparable results. For the successful subsequent treatment the presence of pores is required. The debinding or first heat-treatment with temperatures higher than the preferred range may lead to the closing of the pores which are formed in the same treatment step.

There is a further embodiment in the process of the present invention to achieve the wanted level of porosity. Instead of the step of heat-treatment, it is possible to treat the green body with an aqueous or acidic solution in order to achieve the wanted porosity level. This possibility of a treatment with an aqueous composition is a favourable embodiment since it can be easily performed and does not require the careful control of heating and timing which the pre-sintering requires. A condition for the treatment with the aqueous composition is the suitability of the green body for this kind of treatment.

This may be the case if the binder which has been added in the composition for preparing the green body is easily hydrosoluble, or if at least one of the components which has been added as a binder material is hydrosoluble. Binder material which is used in the art regularly consists of water-soluble as well as water-unsoluble components. The treatment with the aqueous solution may dissolve the components which are soluble in water under the chosen circumstances. The maintained presence of those components which do not dissolve in water shall help to preserve the shape of the green body.

As the aqueous composition for the treatment of the green body to make it porous any of tap water, distilled water or demineralized water may be used. Addition of any further components such as acids, salts or basic materials may be considered, depending on the circumstances. The time for the treatment of the green body with the aqueous composition depends on the composition of the binder material and the porosity level which is desired. The temperature for the treatment may be varied and it is obvious that a higher temperature can lead to an acceleration of the process.

In case of treatment with the aqueous composition, the treated green body shall be dried to remove any remaining water from the pores. Optionally, a heat treatment may also be performed after the treatment with the aqueous composition. The remaining presence of water may have a negative effect on the intended treatment in the next step in the method of the invention and for that reason its absence in the porous green body is preferred.

In the next step the green body which is de-binded is subjected to a treatment with a metal-containing preparation. In the context of the method of the invention the metal-containing preparation acts as a further pigment compound or component, whereby the term "further" provides the distinction from the first pigment component which is present in the composition for preparing the green body.

Any kind of treatment with a metal-containing preparation can be applied as long as the intended effect is achieved, which is to provide the metal in the metal-containing preparation to the debinded green body in such a manner that it can interact with the material of the first pigment component.

Suitable ways of treatment with a metal-containing preparation are for instance the impregnation with a metallic salt solution, the impregnation with a gel containing metallic particles, the impregnation with a gel containing metal oxide particles, the application of a suspension of nanoparticles on the surface of the heat-treated green body, the deposition of metals on the surface using the method of physical vapour deposition (PVD) and the deposition of metals on the surface using chemical physical vapour deposition (CVD). These methods turned out to be suitable to be used in the method of the invention. In some cases, it may be necessary to perform a heat treatment after the application of metal on the surface of the debinded green body so that the metal in the metal-containing preparation diffuses into the green body and becomes available for the interaction with the first pigment component.

The method which turned out to be the most preferable one is the method of impregnation with a solution of a further pigment component.

Impregnation in the sense of the present invention can be achieved by dipping the green body in an impregnating solution, but can also be achieved by ink jet printing, spraying, brushing, serigraphy or tampography, or any further suitable method for applying a solution on a surface of an object.

The impregnating solution is a solution containing a further pigment component. This further pigment component is different from the first pigment component which is present in the composition for preparing the green body.

The solution for impregnation may be an aqueous solution, but where appropriate and depending on the requirements, solutions containing at least one organic solvent are also possible. In the embodiments involving dipping the green body in the impregnating solution an aqueous solution is usually used.

The further pigment component in the impregnating solution may be any pigment component. The further pigment component shall regularly be the salt of a polyvalent metal. In any case the type of further pigment shall have a chemical form which makes it possible to provide it as a solution in an appropriate solvent.

Metals which are suitable for being used as their salt in the impregnating solution are, for example and as a non-limiting list, Al, Co, Cr, Fe, Ni, Zn and Mn. The impregnating solution may contain a salt of one of these metals or a combination of salts of more than one metal. Any combination of salts is possible. The metal salts may be chlorides which is a salt form which displays good solubility. Other salts are possible, such as nitrates and sulfates.

A solution which turned out to be effective is an aqueous solution containing a combination of salts of Fe, Cr and Ni, for example as their chlorides. Impregnation with this specific type of solution is effective in changing an originally blue colour into a black colour. A blue ceramic is for instance a ceramic made from a composition comprising yttriated zirconia with the spinel component $CoAl_2O_4$. Impregnating a green body prepared from this composition with the aqueous solution containing a combination of salts of Fe, Cr and Ni leads to the generation of a black colour in the impregnated area. The same impregnating solution containing Fe, Cr and Ni leads to the generation of a black colour after the impregnation of a green body prepared from yttriated zirconia with $Fe_2O_3$ as the first pigment component, which is a brown ceramic. The same impregnating solution may also change the colour of a sintered product from green to black, where the green ceramic is for example a ceramic prepared from a combination of yttriated zirconia and a green chromium-containing pigment.

Other favourable combinations of second pigment components to achieve a black colour are Fe and Zn; Fe and Cr; Fe, Cr and Zn; Fe, Cr and Mn; Ni and Cr; and Ni, Cr and Mn.

The concentration of the different elements in the solution has to be adjusted to obtain the desired colour, but also to avoid problems following firing (such as adhesion to molds or setters, deformation, decrease of mechanical properties, or breakage).

It is possible to subject the complete surface of the green body to the treatment with the metal-containing preparation as the further pigment component, preferably to the impregnation, but it is a typical embodiment of the present invention to treat only a part of the total surface and/or volume of the green body. This partial treatment of the green body leads after final sintering to the production of a bi-coloured technical ceramic body displaying different colours, in the sense that there is a first coloured area and a second coloured area displaying a different colour. An example is shown schematically in FIG. 1, where the watch component 4, such as a watch case bezel, has a first part 1 of its surface displaying a first colour and a second part 2 of its surface displaying a second colour which is different from the first colour. Preferentially, the difference in colour is marked so as to produce a strong contrast between the two colours, such as brown/black, blue/black, green/black, white/blue, white/brown or white/black for example. It is also possible to produce multi-coloured technical ceramic bodies by performing partial treatment with (at least) two different treatment preparations, according to the preferred embodiment two different impregnating solutions, on different surface areas.

The local colouration can be realized by physical masking and subsequent dipping, e.g., with adhesive tape, with photosensitive resin; by local deposition of the solution by tampography or serigraphy or inkjetting; or any other method that is adapted to the localised and controlled delivery of a liquid solution onto a surface.

The duration of the treatment with the metal-containing preparation shall warrant the sufficient introduction of the pigment component. For example, in one of the preferred embodiments of the treatment through impregnation by dipping, the duration may be adjusted to be conducted during 15 seconds to 20 minutes, preferably between 1 and 15 minutes and more preferably between 2 and 10 minutes. It has been surprisingly observed that a duration of the impregnation of below 1 minute provides a result which is highly satisfactory. So, impregnations during a period as short as from 15 to 45 seconds may lead to the wanted result. This is independent from the temperature chosen for the heat treatment in the first heat-treatment or debinding step. The effect of the pre-treatment at temperatures between 750° C. and 1100° C. has been investigated and no effect of this chosen temperature on the required duration of the impregnation could be observed. The comparison of the impregnation during 1, 5 and 15 minutes showed that at all different pre-treatment temperatures the impregnation during 1 minute was sufficient.

The method of treatment with the metal-containing preparation according to the method of the invention, in particular the preferred impregnation with the impregnation solution, leads to a penetration of the metal component of the metal-containing preparation into the green body. This penetration in the depth of the green body, i.e. in a direction perpendicular to the surface of the green body, leads to a good quality of colouration which for instance is not affected in a negative manner by a polishing treatment or a similar final treatment of the surface. On the other hand, the impregnating solution should ideally not diffuse in a lateral direction, that is in a direction which is parallel to the surface of the green body, since this would lead to a demarcation of the coloured zones which is not sharp. It is the unexpected observation in connection with the present invention that a limited lateral diffusion is observed and the demarcation between the coloured zones in the sintered product is sharp.

A property which may influence the diffusion which is observed in the preferred impregnation treatment is the viscosity of the impregnating solution. A liquid of increased viscosity leads to less diffusion in the green body and the quality of the result which is achieved is accordingly better. Any thickening agent may be used as an optional component in the context of the present invention. Suitable thickening agents are the different types of polyethylene glycol, but basically any conventional thickening agent may be used such as cellulose ether, hydroxycellulose ether, glycerol, ethylene glycol, polyacrylic polymers, polymethacrylic polymers, vinyl polymers, polycarboxylic acids, polyimines and polyamides. The optionally present conventional thickening agent is fired off during the heat treatment in the heat-treatment step which follows impregnation.

The impregnation of the green body is usually conducted with one single impregnating solution. The impregnating solution contains all required components in the appropriate concentration.

It is also possible to conduct the impregnation or any of the other alternative ways of treatment in a sequential manner, whereby the treatment in the basic manner as described above is conducted with several single preparations one after the other. The order of the sequential treatment does not appear to play a role. For instance, in the sequential impregnation with the separate solutions of iron (III) chloride, nickel chloride and chromium chloride the treatment may be started with the solution of iron (III) chloride followed by the solutions of nickel chloride and chromium chloride in that order, but may just as well be started with nickel chloride followed by chromium chloride and iron (III) chloride in that order, or in any further possible sequence of steps. The final result obtained in these different sequential treatments is substantially the same, whereby this final result refers to the colour as well as the mechanical properties. The important step of drying in the method of the present invention using impregnation is conducted in this particular embodiment after the completion of the impregnation with the last impregnation in the sequence of separate impregnations. However, it is also possible to perform drying after each impregnation step.

A further embodiment involving more than one surface treatment step shall be chosen when more than two colours are required in the final product. Different treatments involving differently treated areas are possible and in this embodiment the method can be managed by the separate treatment or covering of chosen areas in a number of subsequent steps, for example by the separate covering of chosen areas in a number of subsequent steps, or by ink-jetting different solutions on different areas. In this manner different designs of the final sintered product may be achieved.

After the impregnation of the green bodies with the impregnating solution, the resulting impregnated green body is subjected to a thorough drying procedure. A typical drying step in the context of the present invention is a drying in air during a few minutes to several hours, such as for example 3 to 24 hours, or 12 to 24 hours, at ambient temperature. Other temperatures may be chosen as well, such as any temperature between ambient temperature and 100° C., e.g. between 60 and 100° C. The duration of the drying step may be adapted to the chosen temperature. For instance when a temperature of between 60 and 100° C. is chosen for the drying step, the duration of drying may be between 1 and 60 minutes. The drying step is an essential step in the method of the present invention using impregnation as the preferred manner of treatment, although varying the conditions does not lead to different colouring. In an industrial environment, it may be important to optimize the drying step in order to eliminate as completely as possible water and HCl (if chloride salts are used) before sintering.

Other ways of treatment with metal-containing preparations usually do not require a separate drying step.

After being dried, the treated body is sintered. When conventional sintering is used, that is when the green body is densified with a conventional sintering process, the sintering is conducted at a temperature in the range of 1300 to 1550° C. Regularly the sintering is conducted at the temperature of 1500° C. The temperature may depend on the circumstances of the case, it is for instance observed that the effect of sintering is promoted through the presence of iron oxide, which allows sintering at a lower temperature such as in the lower part of the above preferred range. As an example, treatment with impregnating solutions containing only an iron salt (such as for instance a solution of $FeCl_3.6H_2O$) has been investigated at different temperatures. Lowering of the treatment temperature by only 30° C. from 1500° C. to 1470° C. improves the observed result of this sintering, in the sense that the microstructure of the sintered product is improved, with a maintenance of grains at the typical zirconia grain size around 0.5 µm without appearance of large grains of cubic phase with a size of 1-2 µm. Accordingly, the composition of the impregnating solution is a relevant circumstance to determine the sintering conditions and in particular the sintering temperature.

The sintering manner implies that the sintering temperature has to be kept constant during a certain period of time, the so-called soak-time. Regularly a soak-time of 2 hours is sufficient to achieve the sintering effect. Shorter or longer soak-times may be chosen if required, such as between 1.5 and 3 hours. The total sintering procedure requires a period of heating until the final sintering temperature is reached and a period of cooling after expiry of the soak-time. The duration of the total sintering procedure including heating and cooling off may be in the range of 24 to 32 hours. A longer sintering procedure may also be used. Also, other conditions and other means than conventional sintering means can be used, as for example Spark Plasma Sintering, Hot Isostatic Pressing or Microwave Assisted Sintering. In such cases, the sintering conditions have to be adapted.

During sintering, the colour of the impregnated area (which means the colour of the area of the ceramic body which is treated with the metal-containing preparation, and in particular which is impregnated with the impregnating solution) and in some cases the colour of the substrate (which means the colour of the area of the ceramic body which is not treated) area, are formed. According to the typical arrangement in the inventive coloured technical ceramic body, the colours in these two areas shall be different.

The colour in the area of the ceramic body which is not impregnated with the impregnating solution depends on the composition containing the first pigment which is used in the preparation of the green body. As non-limiting examples, the colour may be maroon (brown) such as in the case of the presence of $Fe_2O_3$ in yttriated zirconia, green in the case of a green pigment in yttriated zirconia, blue in case of cobalt aluminate (as the spinel pigment $CoAl_2O_4$) in yttriated zirconia, or white in case of aluminum oxide in yttriated zirconia. The area which is treated with the preparation containing the further pigment displays a different colour. The colour which is obtained in the treated area depends on the first pigment component in the composition used in preparing the green body as well as on the composition of the metal-containing preparation, since the colour after treatment (in particular after impregnation) shall be generated through the interaction between the pigment component in the composition used in preparing the green body and the further pigment component in the treatment preparation, in particular the further pigment component in the impregnation solution preparation.

According to a preferred embodiment of the present invention, the surface which is not impregnated has a blue colour, whereas the impregnated surface displays a black colour. The combination of the black colour with the blue colour is a combination which is highly preferred, since the combination provides a contrast which is easily observed. This colour combination is achieved in a preferred embodiment involving cobalt aluminate as the first pigment component and the treatment with a preparation containing Fe, Cr and Ni, and in a more preferred embodiment the impregnation with an aqueous solution of salts of Fe, Cr and Ni.

In case of using impregnation as the preferred embodiment, the efficiency of the impregnation does not appear to depend on the type of counter-ions which are present in the impregnating solution. This aspect has been investigated in connection with impregnating solutions containing Fe, Ni and Cr. The salts of these metals were provided as chlorides as well as nitrates and were investigated in different combinations. All combinations provided a black colour in the impregnated area which is similar to a reference black colour.

The change in the colour is supposed to be caused by a replacement of elements in the crystal lattice of the first pigment component.

X-ray diffraction measurements were carried out on polished pellets and showed the presence of the three usual phases of yttria-stabilized zirconia (tetragonal, cubic and monoclinic), with the tetragonal phase being predominant.

The pigment corresponds to a cubic phase of space group Fd-3m, which is the same phase as the spinel-type $CoAl_2O_4$ pigment of blue ceramic or the $Fe_3O_4$ pigment of black ceramic. This phase is known to accept other elements on the $Co^{2+}$, $Al^{3+}$ and/or $Fe^{2+}/Fe^{3+}$ sites, that can be occupied by, e.g., Al, Co, Cr, Cu, Fe, Mn, Mo, Ni, or Zn with the corresponding oxidation state. Depending on the composition, the colour and the lattice parameter will vary, thereby shifting the X-ray lines.

Figure 2:
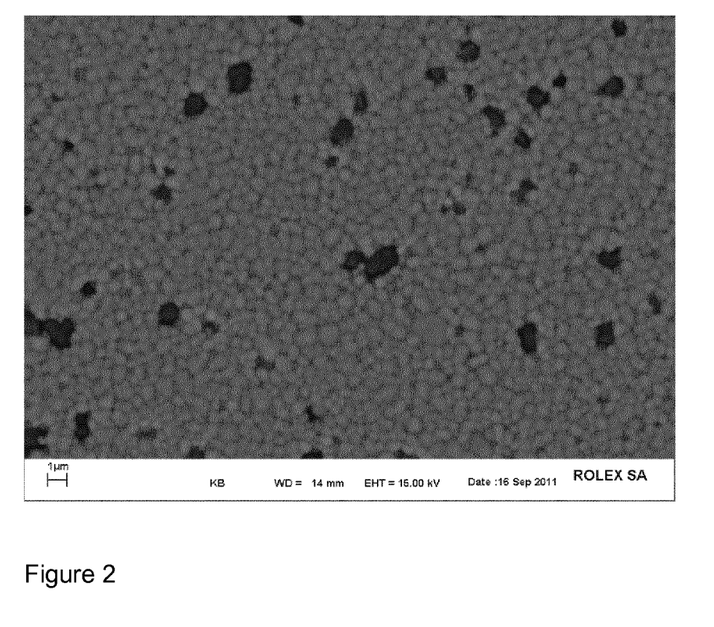
FIG. 2 is a Scanning Electron Microscopy (SEM) micrograph of the microstructure of the impregnated area of a blue ceramic sample after impregnation and sintering, resulting in a black colour, in backscattered electron mode.

The size of the pigment particles is comparable in the impregnated and non-impregnated samples (typically 1-2 μm, see FIG. 2). The microstructure of the ceramic particles is homogeneous and fine with a typical grain size of ~0.5 μm.

It is probable that the pigment which is present in the composition for preparing the green body and the elements in the metal-containing preparation form one single phase in the sintered product. In a sintered product obtained after impregnating an yttriated zirconia containing cobalt aluminate as the pigment component, the chemical analysis performed on the impregnated samples showed that the elements added by the impregnation are present in the sintered ceramic in association with the Co and Al of the pigment. The added elements are not detected outside the zones that correspond to the spinel $CoAl_2O_4$-like particles.

It is a further embodiment of the method of the present invention that the area of the ceramic body which is not treated with the metal-containing preparation is white, such as the case when the yttriated zirconia contains alumina as the first pigment component. Impregnation of a green body prepared from this material with a cobalt-containing solution leads after sintering to the formation of a blue coloured impregnated area. In this case, it is assumed that the generated blue colour is based on the in situ generation of the spinel pigment $CoAl_2O_4$. This in situ formation of the blue pigment is based on the reaction of the Co metal ions with alumina. In this embodiment the impregnating solution may contain a salt of the metals Co, Cu, Cr, Fe, Mg, Mn, Mo, Ni, Ti and Zn, among others. Favourable impregnating solutions for this embodiment are solutions containing salts of Fe, Ni and Cr; Co and Cr; Cr; Cr, Co and Zn; and Ni and Cr. The salts shall regularly be chlorides, but other salts are possible, such as nitrates and sulfates.

A further embodiment of the method of the present invention is to treat in a first step the whole surface of the ceramic body, for example with a first impregnation solution, and to treat in a second step only part of the surface, for example with a second impregnation solution. This double treatment, in particular in the form of a double impregnation, allows to obtain two colours that are different from the colour that is obtained with the non-impregnated starting material. Such a double treatment can be of interest, for example, to adjust finely the colour of the substrate. As an illustrative example, it is thus possible to obtain a darker shade or hue (e.g., with Fe, Ni, Cr, and/or Co-containing solutions in the case of impregnation) or a lighter shade or hue (e.g., with Al-containing solutions in the case of impregnation) of the colour of the non-impregnated starting material, in combination with the second, more contrasting colour obtained with the combination of the first and the second impregnation solutions. As an alternative, only part of the surface of the ceramic body can be treated in a first step, for example with a first impregnation solution, and another part of the surface can be treated in a second step, for example with a second impregnation solution.

Finally, as the last action in the production of coloured technical ceramic body, the products may be polished or subjected to any other final treatment to achieve an exterior appearance in compliance with the intended use. This last action is optional and depends on the intended use of the sintered product.

It has also to be noted that the final colour may be influenced by multiple process and material parameters: the colour of the substrate, the sintering temperature, the pore size distribution of the substrate prior to the impregnation step, in the case of using impregnation the viscosity of the impregnation liquid and the surface tension of the impregnation liquid and of the substrate, the concentration of metals and metallic salts in the preparation or solution, the drying kinetics and conditions (such as temperature and time), and the technique and conditions used for the treatment (in case of impregnation the choice of dipping or ink-jetting—and in the case of ink-jetting, parameters such as drop size, resolution and the number of print repetitions). It will therefore be necessary to adjust and optimize the process parameters to a given experimental situation.

In conclusion, the method of the present invention displays a number of surprising effects:

- the mechanical properties such as hardness, toughness and elastic modulus are not influenced by impregnation;
- the colour obtained by the treatment with the metal-containing preparation is identical or very close to that of commercially available materials:
- the microstructure remains homogeneous and fine-grained; and
- the added elements are located in the pigment component phase, such as for example the spinel $CoAl_2O_4$-like particles.

Next, the coloured technical ceramic bodies are described.

The coloured technical ceramic bodies of the present invention contain a ceramic material, as described above in connection with the method for the preparation of the coloured technical ceramic bodies.

The coloured technical ceramic bodies according to the present invention are not particularly limited according to their shape and may display any form.

The coloured technical ceramic bodies according to the present invention display different coloured areas which are achieved by applying the method of the present invention as described above. Any combination of colours is possible, the first area may for instance be blue, white, brown, red or green, the second area blue, green, brown or black. The choice of the colours depends on the intended use of the technical ceramic bodies and technical as well as purely aesthetic reasons may play a role in their choice.

The coloured technical ceramic bodies comprise a first coloured area and a second coloured area of a different colour. The arrangement of the present invention allows the possibility of further areas of different colour, such as for instance a third area of a further different colour and a fourth such area. Although this option is specifically intended as a further possible embodiment of the present invention it will not be discussed in further detail.

The specific colours in the two areas of different colour are determined by the pigment components which are present. The pigment component in the first area is selected on the basis of the wanted colour in this first area as well as in the second area.

It is particularly preferred to provide a first area of the technical ceramic bodies which displays a blue colour, whereas the second area of the technical ceramic bodies displays a black colour. Further possible colours of the first area are a brown or maroon colour, a green colour or a white colour. Further preferred combinations are a white colour for the first area and a blue or black colour for the second area.

It is a particular feature of the technical ceramic bodies of the present invention that the demarcation between the two areas of different colour is along a sharp line. This is one of the advantages of the method of the present invention for the production of coloured technical ceramic bodies which allows for a formation of the second colour in the second area of the technical ceramic bodies along such a sharp line. Although the formation of the second colour in the method of the present invention is based upon the treatment with a metal-containing preparation, preferably the impregnation with a solution, this treatment does not lead to significant lateral diffusion of the solution in the substrate of the technical ceramic bodies, which is one of the surprising effects of the method of the present invention.

The coloured technical ceramic bodies of the present invention are further distinguished by the usual properties of such materials, such as typically the absence of porosity, the high density and the toughness. Ceramic materials are generally well known for their excellent combination of favourable properties. This includes in particular a favourable mechanical resistance which is in many cases the motivation to choose ceramic materials for particular functions. The colouring of the second area through impregnation followed by drying and sintering could lead to a decrease of the mechanical properties in comparison to the non-impregnated first area. It is the surprising observation that the coloured technical ceramic bodies of the present invention display mechanical properties which are comparable to the properties of non-impregnated ceramic materials of the same type.

The coloured ceramic technical bodies of the present invention can be used in various applications. Since the coloured ceramic technical bodies of the present invention display the usual properties of conventional coloured ceramic technical bodies, they may be used in all applications in which ceramic technical bodies are regularly used.

Obviously the additional aspect of the colouring makes the coloured ceramic technical bodies of the present invention highly appropriate for applications for which the colouring provides an additional value. Such applications are regularly found in ornamental articles such as exterior components for watches, watch cases, broaches, tie pins, cuffing links, exterior components in cell phones and exterior components in home appliances. Coloured ceramic technical bodies are particularly suitable for use in watch cases and bi-coloured watch components, in particular components for the watch case such as blue-black or brown-black bezels. The combination of the mechanical properties with the aesthetic properties makes this a highly suitable application.

Figure 1:
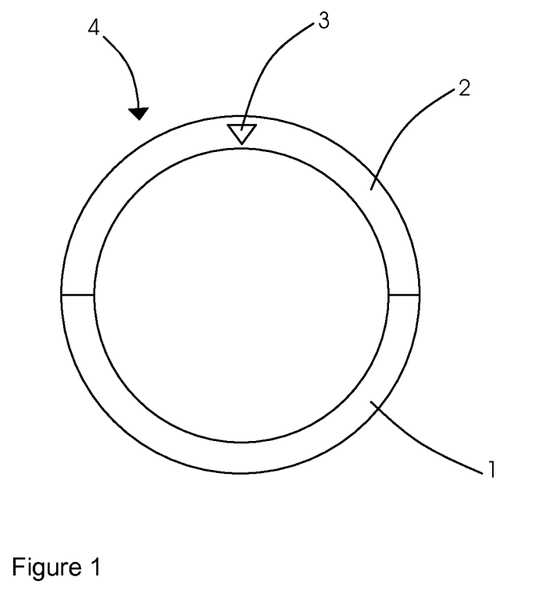
FIG. 1 is a schematic drawing of a bi-coloured watch bezel according to the invention.

FIG. 1 provides a schematic drawing of a coloured watch bezel 4 according to the invention. The watch bezel 4 contains a first area 1 and a second coloured area 2. The second coloured area 2 has been prepared by an impregnation step which has been limited to the area 2.

EXAMPLES

Methods Used in the Examples:

Density

The density is measured following Archimedes' method with absolute ethanol. Each sample is measured three times and the mean value is calculated.

Colorimetry $L^*a^*b^*$ measurements are performed after machining and polishing the sample, on the free side (i.e. the side that was not in contact with the sample holder during heat treatment), with a measurement aperture of 7 mm on three different locations. The equipment is a Minolta CM3610d with D65 illuminant. The colorimetry is indicated as the difference in colour ΔELab (or ΔE) between the measurement and the colour of a reference sample (commercial ceramic of the targeted colour, obtained with a standard pigment). ΔELab is calculated as $\Delta E=(\Delta L^2+\Delta a^2+\Delta b^2)^{0.5}$.

Toughness

The measurements of the toughness were performed by indentation with a KB250 Prüftechnik GmbH equipment. The HV5 indentations were realized under a charge of 5 kg applied during 15 s. The toughness is evaluated through the formula proposed by K. Niihara:

$$K1c=0.0089(E/Hv)^{2/5}\cdot P/(a/c)^{0.5}$$

where E is the elastic modulus ((as measured for example by acoustic microscopy), Hv is the hardness in GPa, P is the charge in N, a is the half-diagonal of the indentation and c is the length of the crack formed following indentation.

Microhardness

HV1 microhardness was measured with a LEICA VMHT MOT equipment with a charge of 1 Kg during 15 s. 10 measurements were performed per sample.

Young's modulus

The Young's modulus and Poisson ratio were measured by acoustic microscopy (non-destructive control by ultrasounds). The relative measurement uncertainty is 2% for both parameters.

Example 1

Chloride-based solutions

The following solutions were tested to obtain black colouration (concentration in mol/l or M) on blue zirconia:

TABLE 1

| Solution | FeCl$_3$•6H$_2$O [M] | NiCl$_2$•6H$_2$O [M] | CrCl$_3$•6H$_2$O [M] | ZnCl$_2$ [M] | MnCl$_2$•4H$_2$O [M] |
|---|---|---|---|---|---|
| S1 | 0.57 | 0.65 | 0.44 | | |
| S2 | 0.29 | 0.33 | 0.22 | | |
| S5 | 0.77 | 0.88 | 0.59 | | |
| S5 + PEG1 | 0.77 | 0.88 | 0.59 | | |
| S5 + PEG2 | 0.77 | 0.88 | 0.59 | | |
| S6 | 1.72 | | | | |
| S7 | 1.72 | | | 0.24 | |
| S8 | 0.77 | | 0.59 | | |
| S9 | 1.00 | | 0.59 | | |
| S10 | 1.00 | | 0.77 | | |
| S11 | 0.77 | | 0.59 | | 0.1 |
| S12 | 0.77 | | 0.59 | | 0.2 |

Solution S5 corresponds to solution S1 with higher salt concentration (S5=S1×1.35).

S6 is a solution without Ni, with Fe only.

S7 is a solution without Ni, with Fe and Zn.

S8 is a solution without Ni, based on Cr and Fe.

S9 and S10 are solutions based on S8 with higher ion concentrations to obtain a deeper kind of black colour.

For solutions S6 and S7, substrates that were pre-treated at 1100° C. were impregnated during 5 minutes, dried and sintered at 1500° C. with 2 h soak-time.

Compositional analysis by EDX showed that the added elements are localized on the blue pigment grains.

Colorimetry measurements were performed for samples impregnated with solutions S1, S5 (all variants), S6 and S7 (S1: samples pre-treated at 750° C., 900° C., 950° C. and 1100° C.; S5: 750° C., 900° C., 950° C., 1100° C. and 1150° C.; S6 and S7: 1100° C. only). The measurements were performed at two different depths (typically, at the surface and at 0.4 mm depth) to evaluate to homogeneity of colouration in the bulk of the samples. The difference of 0.4 mm in depth corresponds typically to half the thickness of a ceramic watch case bezel.

Regardless of solution and pre-treatment, the obtained black colouration was very close (ΔE<1) to the commercial reference, save for solutions containing Mn only (ΔE<2) (results not displayed in the table). The colour is identical at the substrate surface and at 0.4 mm depth.

The blue colouration of the substrate was not modified close to the impregnated zones.

The influence of solution viscosity on the diffusion length and on the sharpness of the demarcation was studied, by adding polyethylene glycol (PEG20) to solution S5. This addition increased the viscosity from 4.3 [mPa·s] for solution S5 to 6.1 and 8.0 [mPa·s] for solutions S5-PEG1 and S5-PEG2, respectively. The presence of PEG markedly slowed the capillary diffusion. However, it seemed also to result in a less homogeneous coloration.

Example 2

Chloride and nitrate-based solutions

The nitrate- and chloride-based solutions indicated below were formulated for deposition by inkjet, and have lower salt concentrations than solution S5 of example 1. Nitrate salts were used to increase the solubility limit of the solutions (except for the Cr salt, which is more soluble under its chloride form). The highest solubility, for comparable concentrations, was obtained by using Fe- and Ni-nitrates and Cr-chloride. All the above solutions yielded a black colour that is similar to the reference black colour.

TABLE 2

| Solution | Fe(NO$_3$)$_3$•9H$_2$O [M] | Ni(NO$_3$)$_2$•6H$_2$O [M] | CrCl$_3$•6H$_2$O [M] |
|---|---|---|---|
| SN1' | 0.77 | 0.22 | 0.145 |
| SN3' | 0.77 | 0.44 | 0.29 |
| SN5' | 0.77 | 0.88 | 0.59 |

The best results were obtained with solution SN1', composed of Fe and Ni nitrates and Cr chloride, as it allows to reach a black colouration with ΔE<1 while having a low ion concentration.

Example 3

Nitrate-based solutions

Chloride-free solutions were also tested, as listed below. The Fe—Ni—Cr solutions yielded a black colour that was similar to the reference black colour. In general, chloride- and nitrate-based solutions yielded comparable results.

TABLE 3

| Solution | Fe(NO$_3$)$_3$·9H$_2$O [M] | Ni(NO$_3$)$_2$·6H$_2$O [M] | Cr(NO$_3$)$_2$·9H$_2$O [M] |
|---|---|---|---|
| N1 | 0.77 | 0.22 | 0.145 |
| N3 | 0.77 | 0.44 | 0.29 |
| N5 | 0.77 | 0.88 | 0.59 |

Example 4

Solutions tested on brown/maroon substrates
The following solutions were successfully tested on brown/maroon yttriated zirconia substrates.

TABLE 4

| Solution | FeCl$_3$·6H$_2$O [M] | NiCl$_2$·6H$_2$O [M] | CrCl$_3$·6H$_2$O [M] | Co(NO$_3$)$_2$·6H$_2$O [M] | MnCl$_2$·4H$_2$O [M] |
|---|---|---|---|---|---|
| S1 | 0.57 | 0.65 | 0.44 | | |
| S1 + Mn | | 0.65 | 0.44 | | 0.1 |
| S1 + Mn2 | | 0.65 | 0.44 | | 0.2 |
| S5 | 0.77 | 0.88 | 0.59 | | |
| S5-CrNi | | 0.88 | 0.59 | | |
| S5 + Mn | | 0.88 | 0.59 | 0.1 | |
| S5 + Mn2 | | 0.88 | 0.59 | 0.2 | |
| S5-S4a | | | | 0.1 | |
| S5-S4b | | | | 0.2 | |
| SC1 | | | | | 0.5 |
| SC2 | | | | | 1.0 |

Mn-containing solutions SC1 and SC2 also yielded satisfactory results to obtain a black colour on maroon substrates.

Example 5

Solutions tested on white substrates
Solutions SB1 and SB2 yielded a blue colour after impregnation of a white yttriated zirconia with alumina as the first pigment component.
The table 5 below summarizes the results obtained on a white yttriated zirconia doped with alumina.

TABLE 5

| Solution | CoCl$_2$ 6H$_2$O [M] |
|---|---|
| SB1 | 0.42 |
| SB2 | 0.84 |

Using a white yttriated zirconia doped with alumina, solutions SB1 and SB2 yielded bi-coloured white and blue products.
In a similar manner, black-and-white coloration was obtained, e.g., with solutions S1 and S2 (described in example 1), using yttriated zirconia.

Example 6

Influence of impregnation duration and pre-treatment temperature on the concentration of fixed salts
The influence of open porosity, which depends on the temperature of the pre-treatment (debinding heat treatment), on the final colour and composition, and the influence of the duration of the impregnation of the ceramic, were tested. For the blue substrates, the temperature was varied between 750 and 1150° C. (tested temperatures: 750, 900, 950, 1100 and 1150° C.), and the impregnation duration between 1 and 15 minutes.

Results obtained for pre-treatment temperatures of 750, 900, 950 and 1100° C. are comparable. These results depend on the substrate that is used: for the brown zirconia, the temperatures are lower than for the blue zirconia.

Regarding the absorption of the solution by capillarity, it is quite rapid as most of the uptake happened in the first minute of impregnation (tests carried out for pre-treatment temperatures of 750, 900, 950 and 1100° C., after immersions of 1 min, 5 min or 15 min).

Example 7

Influence of pre-treatment temperature and of solution composition on the diffusion of the impregnation front
Ideally, the solution should penetrate in depth to give a good colouration but should not diffuse laterally so that the demarcation between two coloured zones remains sharp. The influence of the pre-treatment temperature and of the composition of the solution, on both the diffusion of the solution in the ceramic and on the sharpness of the demarcation, was studied. Each sample was immersed during 5 minutes. The width of the impregnated region was measured, before and after drying the samples (12 h at 40° C. in ambient atmosphere). The sample was then sintered, ground and polished to observe the sharpness of the demarcation.
For pre-treatment at 750, 900, 950 and 1100° C., the diffusion of the solution is comparable. Again, these results depend on the substrate that is used: for the brown zirconia, the temperatures are lower than for the blue zirconia.

Example 8

Concentration of the solutions
The concentrations of different solutions could be varied without impacting the colour, as shown e.g. in Table 1.

Example 9

Sequential impregnation
Samples pre-treated at 1100° C. were impregnated during 2 minutes in separate solutions (solutions with only one of Cr, Ni, and Fe salts) and sequentially in a Cr, than Ni and finally Fe solution, to be compared with samples impregnated with solution S5 that combined Cr, Ni and Fe.

Regarding colour and density, sequential impregnation yielded results similar to solution S5 (ΔE=0.1).

Impregnation with only Cr, Ni or Fe solutions yielded different colours as compared to the black reference colour. $FeCl_3$ produces a blue-tinged black; $NiCl_2$ or $CrCl_3$ produce dark blues.

TABLE 6

| Solution | $FeCl_3 \cdot 6H_2O$ [M] | $NiCl_2 \cdot 6H_2O$ [M] | $CrCl_3 \cdot 6H_2O$ [M] |
|---|---|---|---|
| S5 | 0.77 | 0.88 | 0.59 |
| S5 sequential impregn. | 0.77 | 0.88 | 0.59 |
| S5-S1 | 0.77 | | |
| S5-S2 | | 0.88 | |
| S5-S3 | | | 0.59 |

Example 10

Sintering

The growth of grains was observed for some solutions and is typical for an increase of the proportion of cubic phase, arising from a high sintering temperature. It is also known that iron oxide promotes sintering and allows to lower the sintering temperature.

Therefore, depending on the composition of the solution, the sintering conditions may be adjusted to obtain an optimal result.

Example 11

Realisation of bi-coloured bezels

Bi-coloured ceramic bezels were realized by injection molding followed by impregnation. The bezels showed smooth surfaces with hollows. Impregnation was performed by dipping the debinded green bodies of blue yttriated zirconia in solutions, such as the solutions S1, S5 and S6 described in example 1 and diluted S6 solutions, during typically 30 seconds, with pre-sintering at 950 or 1100° C.

After impregnation, the bezels were dried during 12-24 h at ambient temperature, in air, before sintering at 1500° C. and final polishing. In all cases, colouration was satisfactory with a sharp demarcation between the blue and black zones.

The different process steps may alter the geometry and mechanical properties of the components. Depending on the mechanical operations performed after sintering, as well as on the shrinkage observed after firing, the composition of the solutions and/or treatment conditions may have to be adapted.

Example 12

Maroon/brown substrate

Maroon (brown) zirconia is usually obtained with the addition of $Fe_2O_3$ to yttriated zirconia. The solutions mentioned above (and in particular solutions S1, S5 and SB2) also allow to obtain a bicolour brown-black bezel.

Debinding and pre-sintering conditions were optimized for the starting material. The sintering conditions were also adapted. Impregnation was performed during 1 minute, with subsequent drying in air during 24 h.

Example 13

Green substrate

Solution S1 described in example 1 also allowed to obtain a bi-coloured green-black bezel with yttriated zirconia comprising a green pigment.

Example 14

Maroon/brown substrate

Maroon (brown) zirconia is usually obtained with the addition of $Fe_2O_3$ to yttriated zirconia. Solutions SA1, SA2 and SA3 allow to obtain a bicolour brown-light brown bezel. In other words, using an impregnation solution containing a salt of Aluminum allows to obtain a lighter colour.

A double impregnation was also tested, for example with solution SA4 on the whole bezel, and subsequently solution S5 on part of the bezel. This double impregnation allows to obtain a light brown-black bezel, with a light brown colour that is lighter than the colour of the non-impregnated starting material.

Debinding and pre-sintering conditions were optimized for the starting material. The sintering conditions were also adapted. Impregnation was performed during 1 minute, with subsequent drying in air during 24 h.

| Solution | $AlCl_3$ [M] | $Al(NO_3)_3$ [M] |
|---|---|---|
| SA1 | 1 | 0 |
| SA2 | 1.5 | 0 |
| SA3 | 2 | 0 |
| SA4 | 0 | 2 |

Example 15

Green substrate

Solution SA1 described in example 14 also allowed to obtain a bi-coloured green-blue bezel with yttriated zirconia comprising a green pigment.

Example 16

Blue substrate

Solutions SA1, SA2 and SA3 described in example 14 also allow to obtain a bicolour blue-light blue bezel with a blue zirconia as in example 1. In other words, using an impregnation solution containing a salt of Aluminum allows to obtain a lighter colour.

The invention claimed is:

1. Method for the production of a coloured technical ceramic body, comprising the following steps:
    providing a composition comprising a technical ceramic material, a first pigment component and optionally binder materials,
    preparing a green body from this composition,
    debinding the green body, wherein treatment with heat for debinding the green body is conducted at a temperature in the range of 700 to 1200° C.,
    thereafter subjecting the green body to a treatment with a metal-containing preparation as a further pigment component, and
    sintering the treated green body.

2. The method of claim 1, wherein the composition comprises binder materials and wherein a step of pre-debinding is conducted before the debinding step, wherein the pre-debinding step consists in treating the green body with an aqueous solution and subsequently drying the treated green body, or in treating the green body by heat.

3. The method of claim 1, wherein the technical ceramic material is zirconia, which is stabilized with yttria, calcia, ceria, or magnesia.

4. The method of any of claim 1, wherein the first pigment component is selected from the group consisting of the compounds $Al_2O_3$, CoO, $Co_2O_3$, $Co_3O_4$, $Cr_2O_3$, $Cu_2O$, CuO, $Fe_2O_3$, $Fe_3O_4$, MnO, $Mn_2O_3$, $MnO_2$, $MoO_2$, $MoO_3$, NbO, $NbO_2$, $Nb_2O_5$, NiO, PbO, $PbO_2$, SnO, $SnO_2$, TiO, $Ti_2O_3$, $TiO_2$, $VO_2$, $V_2O_5$, $WO_2$, $W_2O_5$ and $WO_3$.

5. The method of claim 4, wherein the first pigment component is selected from $Al_2O_3$ and $Fe_2O_3$.

6. The method of any of claim 1, wherein the first pigment component is a complex inorganic pigment compound showing a spinel crystal structure of space group Fd-3m.

7. The method of claim 6, wherein the first pigment component has the formula $AB_2O_4$,
wherein A is selected from the group consisting of Fe, Co, Ni, Zn, and Mn, and
wherein B is selected from the group consisting of Al, Cr, and Fe.

8. The method of claim 1, whereby the green body is subjected partly to a treatment with the metal-containing preparation.

9. The method of claim 1, wherein the treatment with the metal-containing preparation is an impregnation with a solution of a metal-containing further pigment component which is followed by drying of the impregnated body.

10. The method of claim 9, wherein the impregnating solution is a solution of at least one salt of Al, Co, Cu, Cr, Fe, Mg, Mn, Mo, Ni, Ti and Zn in water and/or if appropriate at least one organic solvent.

11. The method of claim 9, wherein the drying step after the impregnation is conducted at ambient temperature during 12 to 24 hours, or at 60-100° C. during 1 to 60 minutes.

12. The method of claim 1, wherein the body which has been treated with a metal-containing preparation as a further pigment component and has been optionally dried is sintered at a temperature of between 1300 and 1550° C.

13. The method of claim 1, wherein the coloured technical ceramic body is a watch case or a watch bezel.

14. A coloured technical ceramic body, consisting of a technical ceramic material,
the technical ceramic body comprising a first coloured area and a second coloured area of a different colour,
wherein the first coloured area contains a first pigment component, wherein the first pigment component is selected from the group consisting of $Al_2O_3$, CoO, $Co_2O_3$, $Co_3O_4$, $Cr_2O_3$, $Cu_2O$, CuO, $Fe_2O_3$, $Fe_3O_4$ MnO, $Mn_2O_3$, $MnO_2$, $MoO_2$, $MoO_3$, NbO, $NbO_2$, $Nb_2O_5$, NiO, PbO, $PbO_2$, SnO, $SnO_2$, TiO, $Ti_2O_3$, $TiO_2$, $VO_2$, $V_2O_5$, $WO_2$, $W_2O_5$ and $WO_3$, and
wherein the second coloured area contains a second pigment component, wherein the second pigment component is formed from the first pigment component in combination with one or more metal ions selected from the group consisting of Co, Cu, Cr, Fe, Mg, Mn, Mo, Ni, Ti, and Zn.

15. The coloured technical ceramic body according to claim 14, in which the first coloured area contains a pigment component corresponding to a cubic phase of space group Fd-3m.

16. The coloured technical ceramic body according to claim 14, wherein the first coloured area has a blue, brown or white colour and the second coloured area has a blue, brown or black colour.

17. The coloured technical ceramic body of claim 14 which is a watch case bezel.

18. The coloured technical ceramic body according to claim 15, wherein the pigment component is a $CoAl_2O_4$ pigment.

* * * * *